United States Patent Office 2,801,722
Patented Aug. 6, 1957

2,801,722

FRICTION CLUTCH

Charles B. Spase, Nedrow, N. Y., assignor to Lipe-Rollway Corporation, Syracuse, N. Y., a corporation of New York Application February 10, 1954, Serial No. 409,439

4 Claims. (Cl. 192—68)

This invention has to do with friction clutches and more particularly with a friction clutch adapted for use on power operated devices, the clutch being substituted in place of the conventional drive pulley. In many instances, it is desirable to provide a clutch on a power operated device so that the device may be stopped and started periodically and independently of the driving power. In some such instances it is extremely difficult, if not impossible, to provide a friction clutch which may be substituted for the drive pulley on the device, due to the physical limitations of the dimensions within which the clutch structure must be confined.

A typical example is the refrigerating compressor mounted on an automobile engine to provide an air conditioning system for the automobile. Many automobile purchasers desire an air conditioning system but it is difficult to find room enough to mount the compressor on, or at the front portion of the engine so that it may be driven by the fan or generator belt and when mounted, the only room available for the clutch on the compressor is that occupied by the belt pulley attached to the compressor crank shaft. The clutch is desirable to disconnect the compressor from the engine when the air conditioning system is not needed or desired, as in winter weather.

This invention has as an object a friction clutch embodying a structural arrangement which is cheap and economical to manufacture, which does not occupy substantially any more space than a conventional drive pulley, but which is capable of transmitting torque of relatively great magnitude and which will function over long periods of time without servicing.

The invention consists in the novel features and in the combinations and constructions hereinafter set forth and claimed.

In describing this invention, reference is had to the accompanying drawings in which like characters designate corresponding parts in all the views.

In the drawings—

Figure 1:
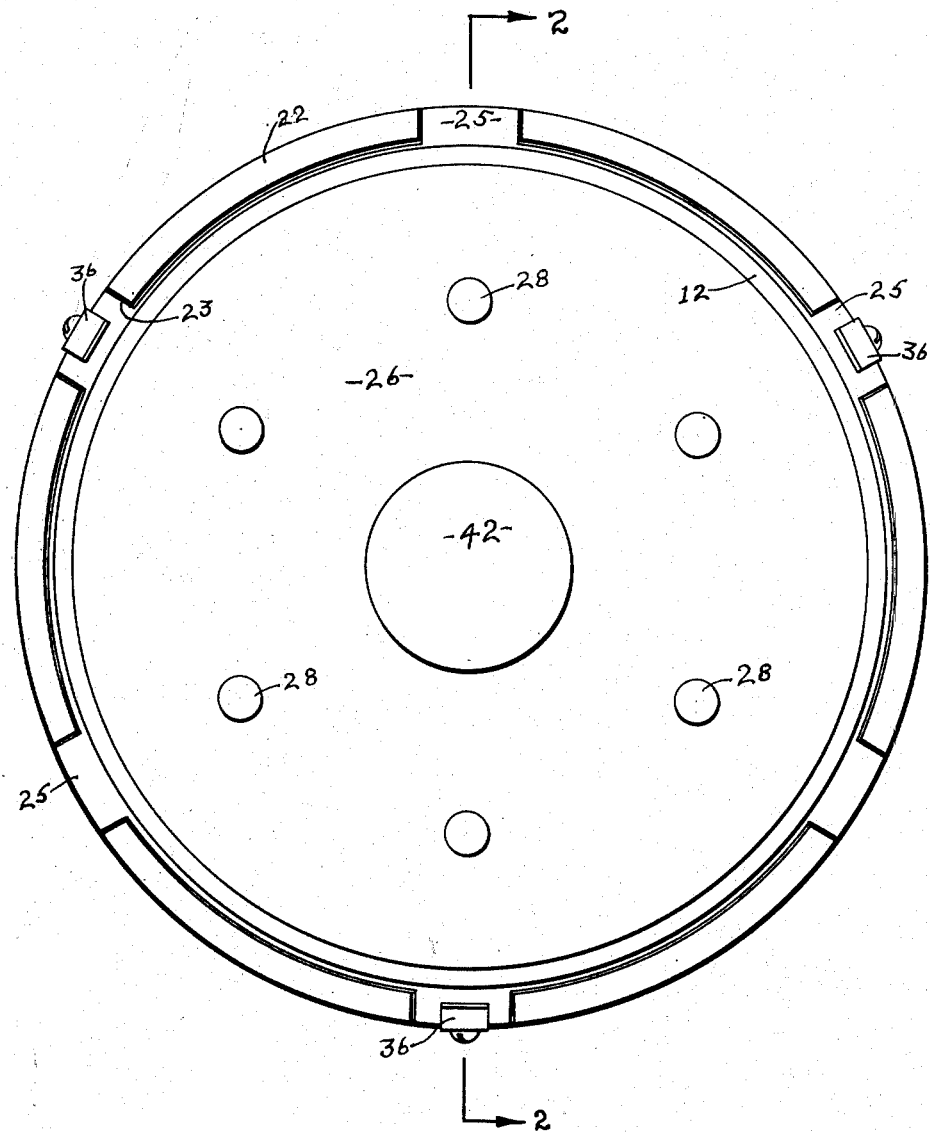
Figure 1 is a front elevational view of a clutch embodying my invention.
Figure 2:
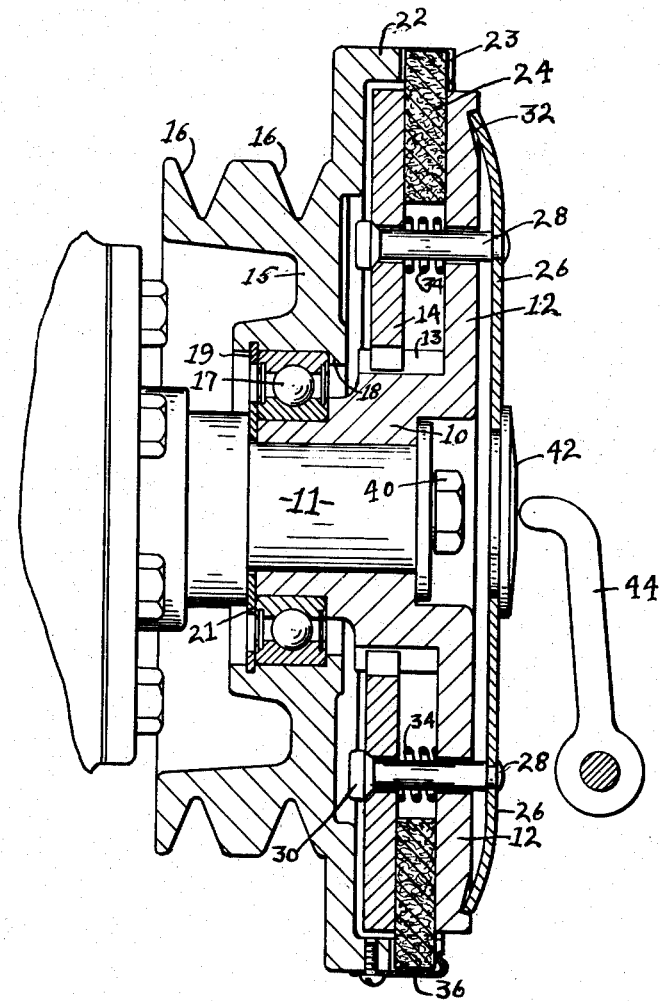
Figure 2 is a vertical sectional view taken on line 2—2, Figure 1.

The clutch consists of a driven hub member 10 formed with a bore to permit it to be mounted upon the shaft 11 of the driven device. The hub 10 is formed or provided with a discoidal plate 12. This plate may be integral with the hub or fixedly secured thereto as by welding. The intermediate peripheral portion of the hub is formed with a series of splines 13 to slidably receive a second discoidal plate 14 which is slidable toward and from the fixed plate 12.

The driving member 15 is journalled for free rotation upon the inner portion of the hub 10. As shown, the driving member 15 is in the form of a pulley having one or more V-belt sheaves 16, the pulley being mounted on a ball bearing 17, the outer race of which is fixedly secured between a shoulder 18 and snap ring 19. The inner race of the bearing abuts against a shoulder on the hub member 10 and is retained in place by a washer 21. The driving member 15 is formed with a cylindrical flange portion 22 arranged in concentrically spaced relation to the hub 10, and is formed with a series of notches 23 extending inwardly from its outer edge. An annular driving plate 24 is detachably mounted on the flange 22. The plate 24 is formed with a series of peripheral projections 25 positioned in the notches 23 of the flange, the plate extending inwardly between the driven plates 12, 14.

A dished plate 26 is positioned on the plate 12 with its concave side confronting the outer surface of the plate 12. The plate 26 is fixedly secured into a circular series of pins 28. These pins extend inwardly through aligned clearance holes formed in the plates 12, 14, and the inner ends of the pins are formed with enlarged head portions 30 engaging the inner surface of the plate 14.

The dished plate 26 is formed of resilient material and serves in conjunction with the pins 28 as spring means for urging the plate 14 against the plate 24, and the latter against the fixed driven plate 12 to maintain the clutch engaged.

Preferably, the outer surface of the plate 12 is formed with a circumferentially extending groove 32 in which the periphery of the plate 26 is positioned. In this manner, the plate 26 is mounted in concentric relation to the clutch driven assembly, and is restrained against radial displacement due to centrifugal forces at high speeds.

Helical compression springs 34 are positioned on the pins 28 intermediate the plates 12, 14, these springs serving to yieldingly urge the plate 14 inwardly from the plate 12 when the plate 26 is pressed inwardly to disengage the clutch. The flange 22 of the driving member may also be provided with springs 36 acting to yieldingly urge the driving plate 24 inwardly from the plate 12 with the projections 25 engaging the bottom of the notches 23, so that when the clutch is disengaged, the plate 24 will be centered between the plates 12, 14, and thereby avoid any drag on the driving and driven plates when the clutch is disengaged.

The plate 26 is formed with a central aperture to permit the clutch to be mounted upon the shaft 14 and secured thereto as by screw 40. A plug 42 is pressed into this aperture and the throw-out arm 44 engages this plug to flex the plate 26 inwardly to effect disengagement of the clutch.

It will be observed that the clutch is formed of parts relatively simple and economical to manufacture. The actual dimension of the clutch is not substantially more than the conventional drive pulley which it replaces and because of the spring plate 26, the clutch is free from actuating linkage and toggles, whereby the clutch is capable of being operated at high speeds without a possible injury due to centrifugal forces.

What I claim is:

1. A friction clutch comprising a driven hub member having a discoidal plate fixed thereto, a second discoidal plate mounted on the hub for axial movement toward and from said first plate, a driving member journalled for free rotation on said hub and having a cylindrical flange arranged in concentric spaced relation to the hub, an annular driving plate detachably mounted on said flange and extending inwardly between said discoidal driven plates, a dished plate arranged with its concave side confronting the outer surface of said first discoidal plate and with its peripheral portion engaging said first discoidal plate adjacent the periphery thereof, a series of pins carried by said dished plate and extending through said discoidal plates, said pins being provided with enlarged head portions at their inner ends engaging the inner surface of said second discoidal plate, said dished plate being formed of resilient material and serving, in conjunction with said pins, as spring means urging said second discoidal plate in engagement with said annular driving plate, and the latter in engagement with said first discoidal driven plate.

2. A friction clutch as defined in claim 1 wherein the outer surface of said discoidal driven plate is formed with a circumferentially extending groove adjacent its periphery to receive the peripheral edge of said dished plate.

3. A friction clutch as defined in claim 1 and including helical compression springs mounted on said pins intermediate said discoidal driven plates, and a series of springs carried by said cylindrical flange of the driving member cooperable with said driving annular plate to yieldingly urge the same in a direction away from said first discoidal plate.

4. A friction clutch comprising a pair of axially spaced apart driven disks, an annular driving member interposed between said disks, a dished plate formed of resilient material, said dished plate being positioned with its concave side confronting the outer surface of one of said driven disks and with its peripheral portion engaging said one disk adjacent the periphery thereof, a series of pins extending through said driven disks and said dished plate, said pins being formed with enlarged head portions and serving, in conjunction with said dished plate, as means operable to yieldingly compress said driven disks against said annular driving member for clutch engagement and to permit clutch disengagement upon the application of axial pressure at the center of said dished plate in a direction toward said driven disks.

References Cited in the file of this patent

UNITED STATES PATENTS

| Number | Name | Date |
|---|---|---|
| 1,062,860 | Stahl | May 27, 1913 |
| 1,913,944 | Morin | June 13, 1933 |
| 1,963,364 | Hazelton et al. | June 19, 1934 |
| 1,991,569 | Nickles | Feb. 19, 1935 |
| 2,104,559 | Hillis | Jan. 4, 1938 |
| 2,244,169 | Miller | June 3, 1941 |
| 2,345,244 | Eason | Mar. 28, 1944 |
| 2,714,437 | Space | Aug. 2, 1955 |